United States Patent
Ohl et al.

(10) Patent No.: US 7,786,853 B2
(45) Date of Patent: Aug. 31, 2010

(54) METHOD FOR TRANSMITTING DATA FROM AT LEAST ONE SENSOR TO A CONTROL DEVICE

(75) Inventors: Christian Ohl, Pfullingen (DE); Oliver Kohn, Reutlingen (DE); Jochen Schomacker, Reutlingen (DE); Michael Ulmer, Moessingen (DE)

(73) Assignee: Robert Bosch GmbH, Stuttgart (DE)

( * ) Notice: Subject to any disclaimer, the term of this patent is extended or adjusted under 35 U.S.C. 154(b) by 737 days.

(21) Appl. No.: 10/491,929

(22) PCT Filed: Sep. 5, 2002

(86) PCT No.: PCT/DE02/03281

§ 371 (c)(1), (2), (4) Date: Sep. 27, 2004

(87) PCT Pub. No.: WO03/034368

PCT Pub. Date: Apr. 24, 2003

(65) Prior Publication Data

US 2005/0068195 A1    Mar. 31, 2005

(30) Foreign Application Priority Data

Oct. 6, 2001  (DE) ................ 101 49 332

(51) Int. Cl.
  *G08B 29/00* (2006.01)
  *G05B 11/01* (2006.01)
(52) U.S. Cl. .............. 340/511; 340/508; 340/509; 340/310.16; 280/735
(58) Field of Classification Search ............. 340/511
  See application file for complete search history.

(56) References Cited

U.S. PATENT DOCUMENTS

| 4,916,432 | A  | * | 4/1990  | Tice et al. ............. 340/518 |
| 5,166,678 | A  |   | 11/1992 | Warrior |
| 5,560,035 | A  |   | 9/1996  | Garg et al. ............ 712/23 |
| 6,459,363 | B1 | * | 10/2002 | Walker et al. ......... 375/238 |
| 2002/0053970 | A1 | * | 5/2002 | Plummer ........... 340/310.01 |

FOREIGN PATENT DOCUMENTS

| DE | 38 11 217  | 10/1989 |
| DE | 42 09 785  | 9/1993  |
| DE | 195 27 813 | 10/1996 |
| DE | 19609290   | 4/1997  |
| DE | 196 16 293 | 10/1997 |

(Continued)

OTHER PUBLICATIONS

Ullmann et al., *Side Airbag Sensor in Silicon Micromachining*, SAE Technical Paper, Mar. 1999, pp. 1-5.

*Primary Examiner*—Donnie L Crosland
(74) *Attorney, Agent, or Firm*—Kenyon & Kenyon LLP

(57) ABSTRACT

A method for transmitting data from at least one sensor to a control unit is described, a value range, which is available for encoding the data to be transmitted, being divided into three portions. The first portion is used for the sensor values. The second portion is used for status signals and error signals, and the third portion is used for sensor identification data, the three portions being separated from one another and following in succession.

11 Claims, 2 Drawing Sheets

FOREIGN PATENT DOCUMENTS

| | | |
|---|---|---|
| DE | 196 46 026 | 5/1998 |
| DE | 197 32 873 | 2/1999 |
| DE | 197 40 021 | 3/1999 |
| DE | 69320143 T | 4/1999 |
| DE | 19813923 | 10/1999 |
| DE | 199 00 105 | 7/2000 |
| DE | 69230057 T | 9/2000 |
| DE | 199 14 645 | 10/2000 |
| DE | 199 45 614 | 12/2000 |
| DE | 101 14 504 | 10/2002 |
| EP | 0596645 | 5/1994 |
| EP | 0 866 316 | 9/1998 |
| EP | 1386299 | 2/2004 |
| JP | 5075627 | 3/1993 |
| JP | 5278612 | 10/1993 |
| JP | 8247789 | 9/1996 |
| JP | 10-107700 | 9/2004 |
| WO | WO 02091327 | 11/2002 |

* cited by examiner

METHOD FOR TRANSMITTING DATA FROM AT LEAST ONE SENSOR TO A CONTROL DEVICE

CROSS-REFERENCE TO RELATED APPLICATIONS

This application claims priority under 35 U.S.C. §119 to PCT/DE02/03281, filed Sep. 5, 2002 and to DE 101 49 332.0, filed Oct. 6, 2001.

FIELD OF THE INVENTION

The present invention is directed to a method for transmitting data from at least one sensor to a control unit.

BACKGROUND INFORMATION

Transmitting data from satellite sensors in a motor vehicle to a control unit via a two-wire line is known from the article entitled "Side Airbag Sensor in Silicon Micromachining" by D. Ullmann et al. in the March 1999 edition of the SAE Technical Paper. This is of particular interest for restraint systems. The signals are generated here via current amplitude modulation. The control unit also supplies electric power in the form of a direct current to the individual sensors via this two-wire line; a power line data transmission is thus created. An 11-bit frame is used for the data transmission, 2 start bits, 8 data bits, and 1 parity bit being provided. A Manchester code is used for the transmission.

SUMMARY OF THE INVENTION

The method according to the present invention for transmitting data from at least one sensor to a control unit has the advantage over the related art that greater reliability regarding the data is achieved and a mix-up is avoided due to the fixed assignment of portions of the available value range for the data transmission to the sensor values, the status signals, the error signals, and the sensor identification data.

It is particularly advantageous that a value range of 10 bits is used in which the largest portion is used for the sensor values, and two smaller portions are used for the status signals, the error signals, and the sensor identification. The 10 bits may advantageously be arranged symmetrically.

Furthermore, it is an advantage that a sensor identification datum, indicating the sensor number, is combined with a corresponding identification code to form a pair and that this pair is repeatedly transmitted for a predefined number of times, the identification code being responsible for the data integrity of the sensor identification. It is thus avoided that a sensor identification is not read by the control unit, in particular when the control unit reads data from the line at a lower data rate than a rate at which the sensor is feeding data into the line. It could possibly occur that a certain sensor identification datum is skipped over and over again. This occurrence is avoided and the sensor identification datum is always read by the control unit via suitable retransmission of this sensor identification datum.

Finally, it is an advantage that a device exists, including a control unit, at least one sensor, and the line which connects the sensor to the control unit, for executing the method according to the present invention. Furthermore, the control unit has a receiver block which reads data from the line at a lower data rate than a rate at which a transmitter block of the at least one sensor transmits data on the line. An additional line for the power supply may be provided which, in addition to the data transmission line which is also used for the sensors' power supply, supplies the sensor with extra power, thereby making sufficient power available which is necessary in particular for sensors having a heating system. Such a line may be useful, even when high voltage is required. A sensor according to the present invention has a transmitter block which feeds data into the line as mentioned above. A control unit according to the present invention has a receiver block which correspondingly reads data from the line as mentioned above. A two-wire line or a different line may be used as this line.

DETAILED DESCRIPTION

A unidirectional two-wire current interface is used for airbag satellite sensors to transmit data from the airbag satellite sensors to a control unit. Various companies use such an interface. To give this interface a more flexible design and to enable an unambiguous identification of sensors, according to the present invention the method for transmitting data from at least one sensor to a control unit is expanded in such a way that the at least one sensor transmits a sensor identification to the control unit after having received the electric power from the control unit. An unambiguous identification of the appropriate sensor is thus possible, so that the control unit may then process the sensor data according to this sensor. Therefore, a control unit may have algorithms for processing different sensors. According to the sensor identification, only the appropriate algorithm is used for processing the sensor values of the particular sensor.

This sensor identification is additionally safeguarded in that identification codes precede the particular data words. By re-transmitting the sensor identification, the probability is increased that the control unit correctly receives the sensor identification. It is now possible to transmit the user data in different logic channels via a two-wire line, a time-division multiplex for example, and it is further possible to use a different transmission rate and resolution for the sensor values. This is then signaled in the sensor identification to ensure correct processing.

According to the present invention, a method for transmitting data from at least one sensor to a control unit is now proposed in which an available value range, from which the data may be encoded, is divided into three portions. A first portion of the value range is available for the sensor values. This range is generally the largest. A second portion is available for status signals and error signals. Signals such as "sensor defective" or "sensor ready" may be received here. A third portion is available for the sensor identification data. The sensor identification data indicates the serial number of a sensor, an associated identification code which is used for the data integrity of the serial number, and also block identification numbers, since transmitted data is combined into blocks which are also given an identification. A value range of 10 bits is typically used. This value range is arranged symmetrically here. Since the sensor typically transmits the data at a higher data rate than a rate at which the control unit is reading the data from the line, it is necessary to repeat the data so that the control unit receives all important data. In particular the sensor identification datum including a corresponding identification code is re-transmitted for a predefined number of times. Sixteen repetitions directly in succession are typically performed.

Figure 1:
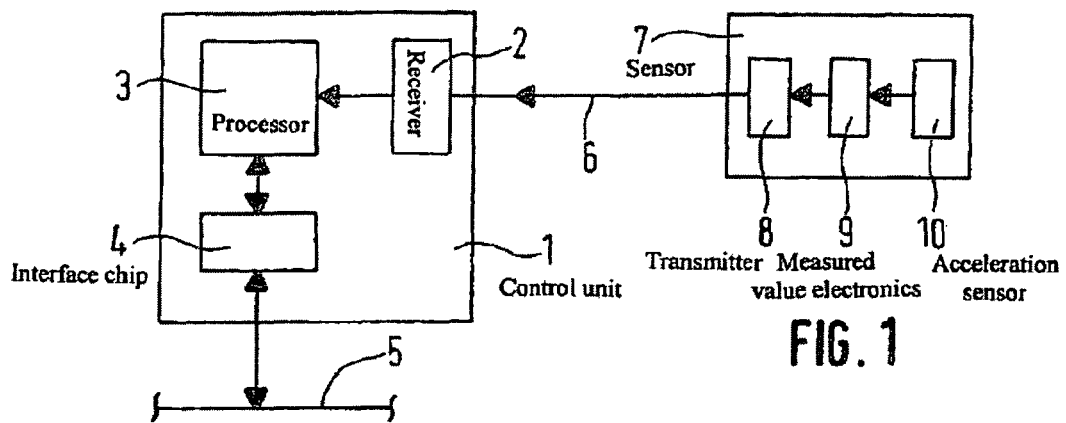
FIG. 1 shows a first block diagram of the device according to the present invention.

FIG. 1 shows the device according to the present invention in a first block diagram. A control unit 1 has a receiver block 2, a processor 3, and an interface chip 4. Processor 3 is connected to receiver block 2 via a data input. Processor 3 is also connected to interface chip 4 via a data input/output. Via a data input/output, interface chip 4 is connected to a bus 5 which is situated in a vehicle. Via the bus, the control unit is then connected to other functional units such as restraint means or other control units. It is also alternatively possible to use two wire lines here instead of a bus.

Via its data input, receiver block 2 is connected to a line 6, to which, as an example, a sensor 7 is connected, which is an acceleration sensor in this case. Multiple sensors, e.g., also a sensor cluster, may also be connected to line 6. Additional lines with sensors may be connected to control unit 1. Receiver block 2 may be designed for only one line or also for multiple lines. Other sensors, such as chemical sensors or other vehicle dynamics sensors, may also be used instead of an acceleration sensor.

Sensor 7 has a transmitter block 8, a sensor element 10, and measured value electronics 9. Sensor element 10, an acceleration sensor in this case and produced micromechanically, is connected to measured value electronics 9 which performs measured value conditioning and measured value digitization. Measured value electronics 9 is connected to transmitter block 8 which transmits the sensor data via line 6.

An initializing phase is executed during the first start-up of sensor 7 which receives its power via line 6 and transmits the data at the same time via a current modulation of the direct current received. Initially, control unit 1 executes a line test of line 6. Subsequent to the first power reception, sensor 7 executes transmission of sensor identification data. Prior to transmission, sensor 7 itself executes a self-test. At the same time, control unit 1 executes an offset adaptation which sensor 7 does not. Subsequent to the sensor identification, sensor 7 also transmits its state, i.e., whether it is in order or has an error. The sensor also executes an offset adaptation in this phase. Subsequent to this initialization normal operation ensues, in which an offset adaptation is also permanently executed.

Figure 2:
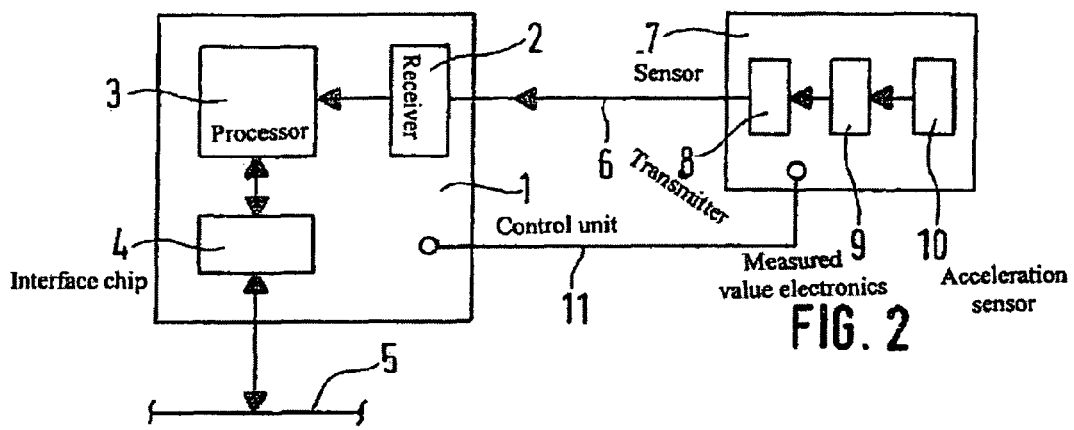
FIG. 2 shows a second block diagram of the device according to the present invention.

FIG. 2 shows a second block diagram of the device according to the present invention, a power supply line 11 being additionally provided here which runs from control unit 1 to sensor 7. In such sensors, which require, for example, heating and thus have a high power demand, it may be the case that the power supply via data line 6 is not sufficient. An additional line 11 must be provided in such a case to cover the additional power demand of sensor 7.

Figure 3:
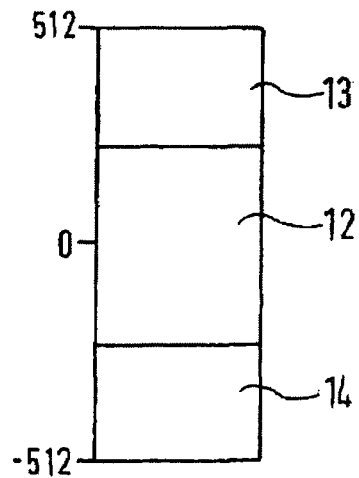
FIG. 3 shows the division of the available value range according to the present invention.

FIG. 3 shows the value range of 10 bits which is available for data transmission via line 6. The value range is placed here symmetrically around zero, so that ±512 are the outer limits. The largest value range ±480 is used for the sensor values. This range is indicated here by reference numeral 12. Using reference numeral 13, a value range of 481-511 is provided which is available for status signals and error signals, as described above. This range is indicated by reference numeral 13. The last, i.e., the third range, which has values of −481 to −512, is indicated by reference numeral 14. The sensor identification data, the identification codes, and the block identifications are encoded here. The division into these three ranges provides greater reliability, which, in particular, prevents mix-ups.

Figure 4:
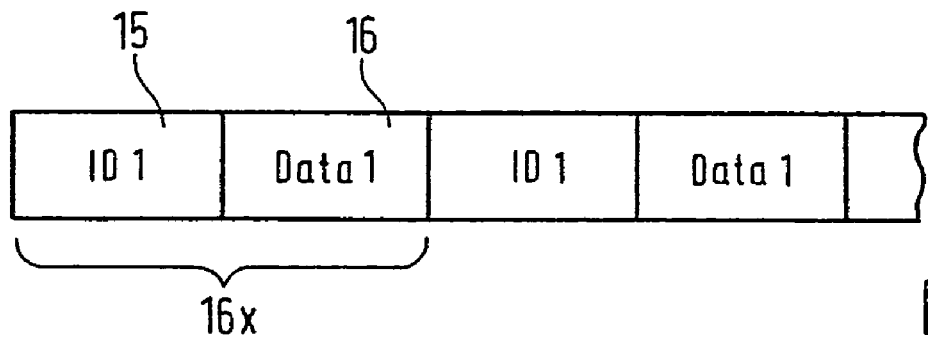
FIG. 4 shows a sensor identification datum including its identification code.

FIG. 4 shows an example of how a sensor identification 16, denoted using the term Data1, and an associated identification code ID1 with the reference numeral 15 are combined to form a pair. This pair is then repeated sixteen times since, as described above, receiver block 2 of control unit 1 reads data slower than transmitter block 8 of sensor 7 feeds data into line 6. Via the sixteen-fold repetition, cited here only as an example, it is ensured that receiver block 2 really reads this pair ID1 and Data1.

Figure 5:
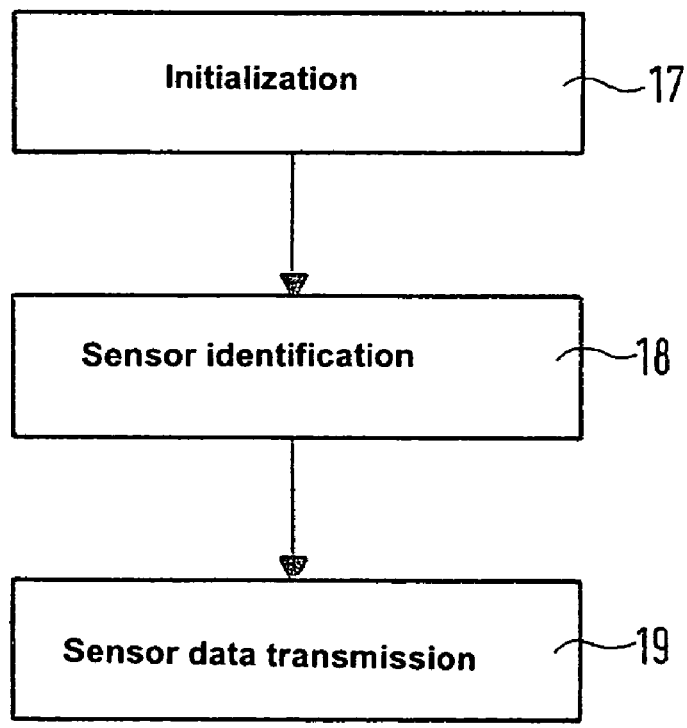
FIG. 5 shows a flow diagram of the method according to the present invention.

FIG. 5 shows a flow diagram of the method according to the present invention. Initializing of the device according to the present invention takes place in method step 17. As described above, control unit 1 initially executes a test of line 6; an offset adaptation is executed at the same time. Transmission of the sensor identification, described above using identification code 1 and sensor identification Data1 as an example, takes place in method step 18. As described above, this is repeated sixteen times. Different blocks are used here having the sixteen-fold repetition of sensor identification. Sixteen blocks are typically identified. Finally, actual data transmission follows in method step 19.

What is claimed is:

1. A method for transmitting data from at least one sensor to a control unit, a line being used for each of the at least one sensor and a predefined value range being available for the data, the method comprising:
   using a first portion of the value range for at least one sensor value;
   using a second portion of the value range for one of at least one status signal and at least one error signal;
   using a third portion of the value range for sensor identification data;
   separating the first portion, the second portion, and the third portion from each other; and
   causing the first portion, the second portion, and the third portion to follow each other in succession.

2. The method as recited in claim 1, wherein:
   the line includes a two-wire line.

3. The method as recited in claim 1, wherein:
   the value range includes 10 bits.

4. The method as recited in claim 1, wherein:
the value range is symmetrical.

5. The method as recited in claim 1, further comprising:
combining an appropriate sensor identification datum with a corresponding identification code to form a pair; and
repeatedly transmitting the pair for a predefined number of times, wherein:
the identification code ensures a data integrity of the sensor identification datum.

6. The method as recited in claim 5, wherein:
the at least one sensor transmits at a higher data rate than a rate at which the control unit reads data.

7. A device, comprising:
a control unit;
at least one sensor;
a line; and
a receiver block that reads data from the line at a lower data rate than a rate at which a transmitter block of the at least one sensor transmits data to the line.

8. The device as recited in claim 7, wherein:
the line is usable for a power supply of the at least one sensor, and
a power supply line is provided.

9. The sensor as recited in claim 7, wherein:
the at least one sensor includes a measured value electronics and a sensor element.

10. The control unit as recited in claim 7, wherein:
the control unit includes a receiver block, a processor, and an interface chip.

11. A device, comprising:
a control unit;
at least one sensor;
a line; and
a receiver block which reads a highest data rate which is lower than a rate at which a transmitter block of the at least one sensor transmits data to the line for the receiver block.

* * * * *